United States Patent
Mimura

(10) Patent No.: US 8,517,546 B2
(45) Date of Patent: Aug. 27, 2013

(54) MULTI-DIRECTIONAL CUBE CORNER RETROREFLECTIVE ARTICLE

(75) Inventor: Ikuo Mimura, Uozu (JP)

(73) Assignee: Nippon Carbide Industries Co., Inc., Tokyo (JP)

(*) Notice: Subject to any disclaimer, the term of this patent is extended or adjusted under 35 U.S.C. 154(b) by 388 days.

(21) Appl. No.: 12/934,718

(22) PCT Filed: Mar. 31, 2009

(86) PCT No.: PCT/JP2009/001472
§ 371 (c)(1),
(2), (4) Date: Oct. 27, 2010

(87) PCT Pub. No.: WO2009/122713
PCT Pub. Date: Oct. 8, 2009

(65) Prior Publication Data
US 2011/0051242 A1    Mar. 3, 2011

(30) Foreign Application Priority Data

Mar. 31, 2008  (JP) .................. 2008-089423
Mar. 26, 2009  (JP) .................. 2009-076997

(51) Int. Cl.
*G02B 5/124*    (2006.01)

(52) U.S. Cl.
USPC .......................... 359/530; 359/529

(58) Field of Classification Search
USPC ................................. 359/529–530
See application file for complete search history.

(56) References Cited

U.S. PATENT DOCUMENTS

| | | | |
|---|---|---|---|
| 2,310,790 | A | 2/1943 | Jungersen |
| 4,775,219 | A | 10/1988 | Appeldorn et al. |
| 5,022,739 | A | 6/1991 | Bennett et al. |
| 5,137,841 | A | 8/1992 | Takeda et al. |
| 5,138,488 | A | 8/1992 | Szczech |
| 5,171,624 | A | 12/1992 | Walter |
| 5,175,645 | A | 12/1992 | Bennett et al. |
| 5,565,151 | A | 10/1996 | Nilsen |
| 5,706,132 | A | 1/1998 | Nestegard et al. |
| 5,898,523 | A | 4/1999 | Smith et al. |
| 5,936,770 | A | 8/1999 | Nestegard et al. |
| 6,036,322 | A | 3/2000 | Nilsen et al. |
| 6,685,323 | B1 | 2/2004 | Mimura et al. |
| 6,890,634 | B1 | 5/2005 | Yoon et al. |
| 7,938,549 | B2 | 5/2011 | Mimura |
| 2009/0161217 | A1 | 6/2009 | Mimura |

FOREIGN PATENT DOCUMENTS

| | | |
|---|---|---|
| CA | 2 636 782 | 6/2007 |
| CN | 101317107 | 12/2008 |
| EP | 0 137 736 | 4/1985 |
| EP | 0 548 280 | 6/1993 |

(Continued)

*Primary Examiner* — James Phan
(74) *Attorney, Agent, or Firm* — Fitzpatrick, Cella, Harper & Scinto

(57) ABSTRACT

An object of the invention is to provide a multi-directional cube corner retroreflective article (may be referred to as a retroreflective article, hereinafter) capable of improving entrance angle characteristic and rotation angle characteristic.

A multi-directional cube corner retroreflective article, wherein a large number of retroreflective element assemblies, each of which is formed by assembling triangular pyramidal cube corner retroreflective elements each having an isosceles-triangular base (ABC) and an element apex (H) while sharing an apex (C) and base lines of equal length (AC and BC) of the base, are connected, and a shape of an outer circumference of each of the retroreflective element assemblies is a regular polygon and the bases of at least two of the triangular pyramidal cube corner retroreflective elements are not parallel to a common plane including the outer circumference.

20 Claims, 14 Drawing Sheets

(56) References Cited

FOREIGN PATENT DOCUMENTS

| | | |
|---|---|---|
| EP | 1 965 232 | 9/2008 |
| HK | 1044195 | 10/2005 |
| JP | 11-149006 | 6/1999 |
| JP | 11-305017 | 11/1999 |
| JP | 2003509715 | 3/2003 |
| WO | 00/52503 | 9/2000 |
| WO | 01/20373 | 3/2001 |
| WO | 2007/064033 | 6/2007 |

MULTI-DIRECTIONAL CUBE CORNER RETROREFLECTIVE ARTICLE

TECHNICAL FIELD

The invention relates to a multi-directional cube corner retroreflective article.

The invention particularly relates to a retroreflective article that is an article for effectively retro-reflecting light entering from various directions, that has excellent entrance angle characteristic and rotation angle characteristic, and that is used for a traffic sign.

A multi-directional cube corner retroreflective article according to the invention can achieve improvement of wide angle visibility of a display device such as a liquid crystal display device or an organic electro-luminescence display device and improvement of brightness of a display.

BACKGROUND ART

Conventionally, some proposals have been made relating to a retroreflective article having an excellent wide angle performance and having improved entrance angle characteristic, observation angle characteristic, and rotation angle characteristic.

For such a cube corner retroreflective article, a lot of proposals to improve entrance angle characteristic or observation angle characteristic in particular of a triangular pyramidal cube corner retroreflective sheeting have been known since early times and various improvements have been considered. In many of these techniques, entrance angle characteristic is improved by canting an optical axis of a retroreflective element.

For example, U.S. Pat. No. 2,310,790 (Patent Document 1) by Jungersen discloses a technique in which retroreflective elements of various shapes are arranged on a thin sheet. Triangular pyramidal reflective elements exemplified in the U.S. patent include: a triangular pyramidal reflective element in which an apex is positioned at a center position of its triangular base, an optical axis is not canted, and the shape of the base is equilateral triangle; and a triangular pyramidal reflective element in which an apex is not positioned at a center position of its triangular base, and the shape of the base is isosceles triangle. It is described that with a triangular pyramidal reflective element, light can be effectively reflected to an approaching vehicle (entrance angle characteristic can be improved).

In addition, the document describes as a size of a triangular pyramidal reflective element that a depth of the element is equal to or less than 1/10 inch (2,540 μm). Further, FIG. 15 of the U.S. patent shows a pair of triangular pyramidal reflective elements having optical axes that are canted in positive (+) direction. A cant (θ) of each of the optical axes can be estimated to be about 6.5° by calculating from a ratio between lengths of a longer side and a shorter side of an isosceles-triangular base of each of the shown triangular pyramidal reflective element.

EP Patent No. 137,736B1 (Patent Document 2) by Hoopman discloses a retroreflective sheeting and a retroreflective article, in which pairs of canted triangular pyramidal cube corner retroreflective elements each having a base in a shape of isosceles triangle are arranged on a thin sheet in a rotated state by 180° with respect to each other of each pair and their bases are closely packed on a shared plane. An optical axis of the triangular pyramidal cube corner retroreflective element described in the patent is canted in negative (−) direction and it is described that the cant is about 7° to 13°.

In addition, U.S. Pat. No. 5,138,488 (Patent Document 3) by Szczech also discloses a retroreflective sheeting and a retroreflective article, in which canted triangular pyramidal cube corner retroreflective elements each having a base in a shape of isosceles triangle are arranged on a thin sheet and their bases are closely packed on a shared plane. In the U.S. patent, an optical axis of the triangular pyramidal reflective element is canted in a direction of a side shared by two triangular pyramidal reflective elements facing each other to form a pair, that is, in positive (+) direction, and the cant is about 2° to 5°. It is described that a size of the element is 25 μm to 100 μm.

In a retroreflective sheeting and the retroreflective article described in EP Patent No. 548,280B1 (Patent Document 4) corresponding to the patent, a distance between a surface including a side shared by two elements in pair and perpendicular to a shared plane and an apex of each element is not equal to a distance between a point where an optical axis of the element crosses the shared plane and the perpendicular surface, and the cant of the optical axis is about 2° to 5°. It is described that a size of the element is 25 μm to 100 μm.

In the retroreflective sheeting and the retroreflective article described in EP Patent 548,280B1 by Szczech, a cant of the optical axis is about 2° to 5° in both of positive (+) and negative (−) directions as described above. However, an example of the U.S. patent and EP Patent by Szczech described above only disclose a triangular pyramidal reflective element in which a cant of an optical axis is (−)8.2°, (−)9.2°, and (−)4.3° and which has a height (h) of 87.5 μm.

Also relating to improvement of observation angle characteristic, various proposals have been made.

U.S. Pat. No. 4,775,219 (Patent Document 5) by Appeldorn discloses a cube corner retroreflective article, in which a V shaped groove forming elements is asymmetric. An angle of the V shaped groove has a slight deviation from an angle of a theoretical V shaped groove forming a cube corner. Improvement of the observation angle characteristic is attempted by periodically changing deviation causing asymmetry of adjacent V shaped-grooves.

However, periodically changing the angle of adjacent V shaped grooves increases difficulty of die machining. Even if the difficulty can be overcome, combinations of deviations that can be provided is limited, and thus uniform spread of reflected light cannot be provided. In addition, some types of working tools such as a diamond bite for forming V shaped grooves are required for one V shaped groove direction. Further, a highly accurate working technique is required when V shaped grooves are formed asymmetrically.

U.S. Pat. No. 5,171,624 (Patent Document 6) by Walter discloses a triangular pyramidal retroreflective element, in which reflective lateral surfaces having cross-sectional shapes of a constant quadric surface are formed by using a working tool having a curved cross-section. In such a triangular pyramidal retroreflective element formed with reflective lateral surfaces having quadric surface, an appropriate divergence of retro-reflected light is possible, and thus observation angle characteristic can be improved.

However, it is of great difficulty to form a working tool having such a curved cross-section shape in an intended shape. Therefore, it has been of great difficulty to obtain the quadric surface according to the intended design due to the difficulty to work the tool. In addition, since a curved shape that can be provided is determined only by a shape of a working tool that is used, it has not been possible to form various shapes of quadric surfaces on one retroreflective article.

U.S. Pat. No. 5,565,151 (Patent Document 7) by Nilsen discloses a retroreflective sheeting, in which a part of a reflective lateral surface (A-B-H) is cut off to form a triangular prism shaped part (A-A1-A2-B2-B1-B) and a new reflective lateral surface (A2-H1-B2) that accelerate divergence of retro-reflected light so as to improve observation angle characteristic.

However, for the invention by Nilsen, specific description about a preferable shape of triangular prism to be provided and a preferable angle with which new reflective lateral surfaces are formed is not much provided. In addition, a special tool for cutting off a part of a reflective lateral surfaces to form a triangular prism shaped part is required. Further, the newly formed triangular prism shaped element does not have a function of retroreflection but is intended to attain spread of retro-reflected light by merely dispersing light in various directions.

However, the technique for improving entrance angle characteristic and observation angle characteristic cannot improve rotation angle characteristic.

Also relating to improvement of rotation angle characteristic, various proposals have been attempted, but any of the proposals intends to improve rotation angle characteristic by combining directions of retroreflective elements having triangular shaped bases divided into various regions.

As documents describing such improvement, U.S. Pat. No. 5,022,739 (Patent Document 8), U.S. Pat. No. 5,132,841 (Patent Document 9), and U.S. Pat. No. 5,175,645 (Patent Document 10) by Bennett et al., U.S. Pat. No. 6,036,322 (Patent Document 11) by Nilsen, U.S. Pat. No. 5,706,132 (Patent Document 12), and U.S. Pat. No. 5,936,770 (Patent Document 13) by Nestegard, and U.S. Pat. No. 5,898,523 (Patent Document 14) by Smith can be exemplified, for example.

[Patent Document 1] U.S. Pat. No. 2,310,790
[Patent Document 2] EP Patent No. 137736B1
[Patent Document 3] U.S. Pat. No. 5,138,488
[Patent Document 4] EP Patent No. 548280B1
[Patent Document 5] U.S. Pat. No. 4,775,219
[Patent Document 6] U.S. Pat. No. 5,171,624
[Patent Document 7] U.S. Pat. No. 5,565,151
[Patent Document 8] U.S. Pat. No. 5,022,739
[Patent Document 9] U.S. Pat. No. 5,132,841
[Patent Document 10] U.S. Pat. No. 5,175,645
[Patent Document 11] U.S. Pat. No. 6,036,322
[Patent Document 12] U.S. Pat. No. 5,706,132
[Patent Document 13] U.S. Pat. No. 5,936,770
[Patent Document 14] U.S. Pat. No. 5,898,523

DISCLOSURE OF THE INVENTION

Problem to be Solved by the Invention

In any of the techniques disclosed in the Patent Documents, however, a cube corner retroreflective article has bases of elements positioned on a common plane including an outer circumference of an element assembly even though a shape of regions to divide elements and a direction of elements vary in each of the techniques.

Therefore, an object of the invention is to provide a multi-directional cube corner retroreflective article (may be referred to as a retroreflective article, hereinafter) capable of improving entrance angle characteristic and rotation angle characteristic.

Means for Solving the Problems

A multi-directional cube corner retroreflective article according to the invention is a multi-directional cube corner retroreflective article wherein a large number of retroreflective element assemblies, each of which is formed by assembling triangular pyramidal cube corner retroreflective elements each having an isosceles-triangular base (ABC) and an element apex (H) while sharing an apex (C) and base lines of equal length (AC and BC) of the base, are connected, and a shape of an outer circumference of each of the retroreflective element assemblies is a regular polygon and the bases of at least two of the triangular pyramidal cube corner retroreflective elements are not parallel to a common plane including the outer circumference.

In the multi-directional cube corner retroreflective article described above, the apex (C) shared by the bases of the respective triangular pyramidal cube corner retroreflective elements included in each of the retroreflective element assemblies is preferably positioned lower than the common plane.

In the multi-directional cube corner retroreflective article described above, the apex (C) shared by the bases of the respective triangular pyramidal cube corner retroreflective elements included in each of the retroreflective element assemblies is preferably positioned higher than the common plane.

In the multi-directional cube corner retroreflective article described above, each of the retroreflective element assemblies preferably includes $4 \times (2n-1)^2$ or $6 \times 4^{n-1}$ (n is an integer of 1 or more) triangular pyramidal cube corner retroreflective elements. By configuring in such a way, a retroreflective element assembly can be formed with triangular pyramidal cube corner retroreflective elements packed on a plane so that high retroreflective performance can be obtained.

In the multi-directional cube corner retroreflective article described above, a length of a base lines (AB) pinched between the base lines of equal length (AC and BC) of the base of each of the triangular pyramidal cube corner retroreflective elements is preferably 20 to 1000 μm. By configuring in such a way, a size of the triangular pyramidal cube corner retroreflective elements can be appropriate so that a spread of retro-reflected light of the triangular pyramidal cube corner reflective elements can be in appropriate state and flexibility of the multi-directional cube corner retroreflective article can be appropriate.

In the multi-directional cube corner retroreflective article described above, a length of a base lines (AB) pinched between the base lines of equal length (AC and BC) of the base of each of the triangular pyramidal cube corner retroreflective elements is preferably 35 to 200 μm.

In the multi-directional cube corner retroreflective article described above, a ratio between a distance from the apex (C) pinched between the base lines of equal length (AC and BC) of the base of each of the triangular pyramidal cube corner retroreflective elements to the common plane and a length of the base lines pinched between the base lines of equal length (AC and BC) of the base of each of the triangular pyramidal cube corner retroreflective elements is preferably 1/100 to 20/100. By configuring in such a way, the cant of the optical axes is not too small so that entrance angle characteristic can be sufficiently improved, the cants of the optical axes are appropriate so that the work can be easy, and the thickness of the multi-directional cube corner retroreflective article can be appropriate so that the multi-directional cube corner retroreflective article can be flexible.

In the multi-directional cube corner retroreflective article described above, a ratio between a distance from the apex (C) pinched between the base lines of equal length (AC and BC) of the base of each of the triangular pyramidal cube corner retroreflective elements to the common plane and a length of the base lines pinched between the base lines of equal length (AC and BC) of the base of each of the triangular pyramidal cube corner retroreflective elements is preferably 3/100 to 20/100.

Effect of the Invention

According to the invention, a cube corner retroreflective article capable of improving entrance angle characteristic and rotation angle characteristic can be provided.

DESCRIPTION OF REFERENCE SYMBOLS

Figure 1:
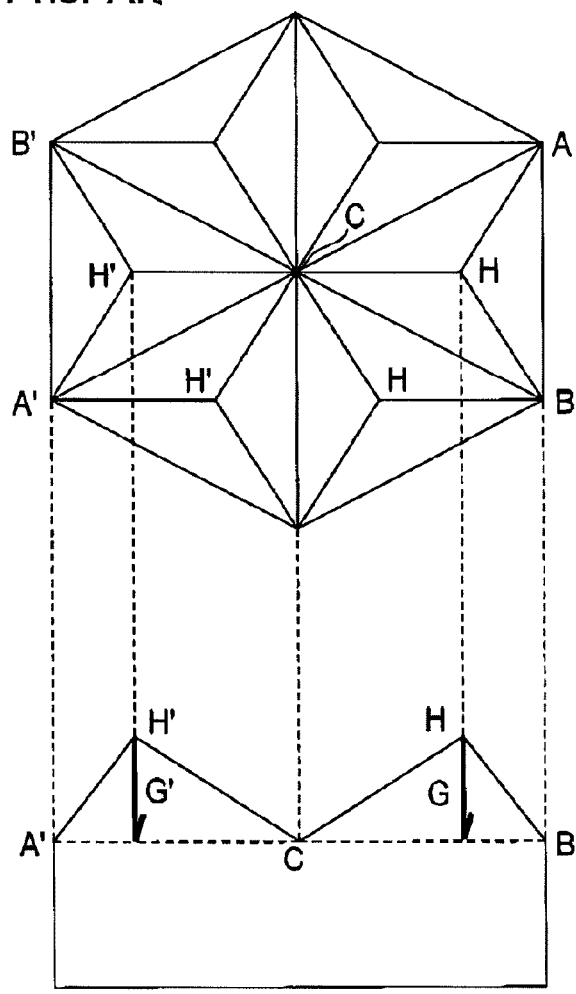
FIG. 1 is a view showing a retroreflective element assembly according to a conventional technique.

| | |
|---|---|
| ABC, A'B'C | base |
| AB, A'B' | base lines |
| AC, BC, A'C, B'C | base lines of equal length |
| C | apex |
| G, G' | optical axis |
| H, H' | element apex |
| R, R' | optical axis |

BEST MODE FOR CARRYING OUT THE INVENTION

A preferred embodiment of a multi-directional retroreflective article according to the invention will be explained hereinafter referring to the drawings.

FIG. 1 shows a cube corner retroreflective element assembly (may be referred to as a retroreflective element assembly, hereinafter) included in a retroreflective article according to a conventional technique. This retroreflective article is formed by a plurality of cube corner retroreflective elements (may be referred to as retroreflective elements) each having an equilateral-triangular base and bases of the respective retroreflective elements are positioned on the common plane that is shared.

Optical axes G and G' in all of the retroreflective elements of the retroreflective element assembly shown in FIG. 1 are perpendicular to the common plane and all of the elements have the same shape. Therefore, entrance angle characteristic and rotation angle characteristic are poor.

In addition to the retroreflective element shown in FIG. 1, it is known a retroreflective article, in which a plurality of canted cube corner retroreflective elements each having a base of isosceles triangle and having canted optical axes G and G' with respect to the base are assembled. In such a conventional retroreflective article, each of the bases of respective canted cube corner retroreflective elements is positioned on a shared common plane.

Figure 2:
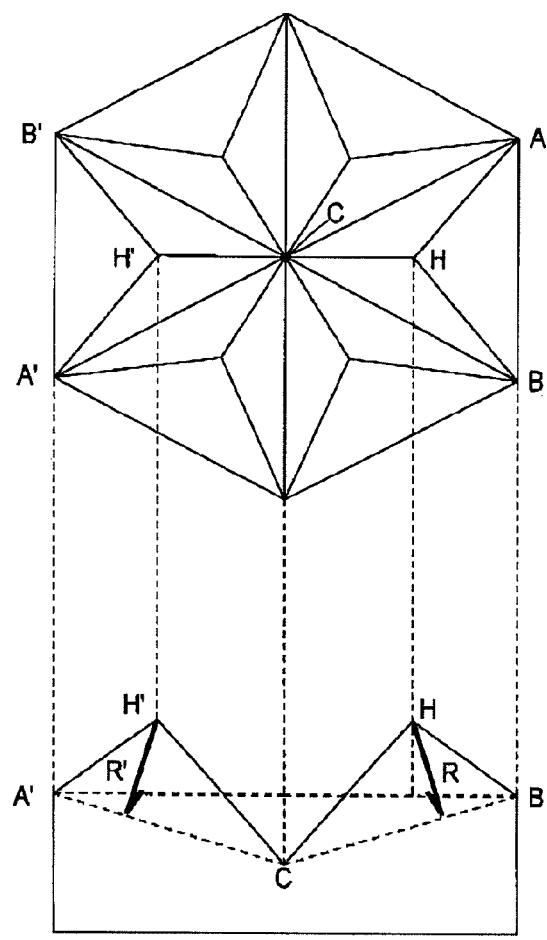
FIG. 2 is a view showing an embodiment of a retroreflective element assembly included in a retroreflective article according to the invention.

FIG. 2 is a plan view showing an embodiment of a retroreflective element assembly included in a retroreflective article according to the invention. As shown in FIG. 2, the retroreflective element assembly included in the retroreflective article according to the invention is configured by using $6\times4^{n-1}$ (n is an integer of 1 or more) retroreflective elements of the same shape having a base in a shape of isosceles triangle. The retroreflective element assembly according to the embodiment is in a state of n=1, and thus includes six retroreflective elements. An embodiment of a retroreflective article according to the invention is configured by connecting a large number of the retroreflective element assemblies. In the retroreflective element assembly according to the embodiment, an apex C shared by respective bases of the respective retroreflective elements is positioned lower than a common plane (shown as A'-B in the sectional view) including an outer circumference of the retroreflective element assembly so that bases of the respective retroreflective elements are not parallel to the common plane.

Optical axes R and R' of respective retroreflective elements shown in FIG. 2 are oriented toward six directions since the bases of the respective retroreflective elements are not parallel to each other. Therefore, compared to the conventional cube corner retroreflective element assembly shown in FIG. 1, entrance angle characteristic and rotation angle characteristic are excellent in an entering direction of external light.

Figure 3:
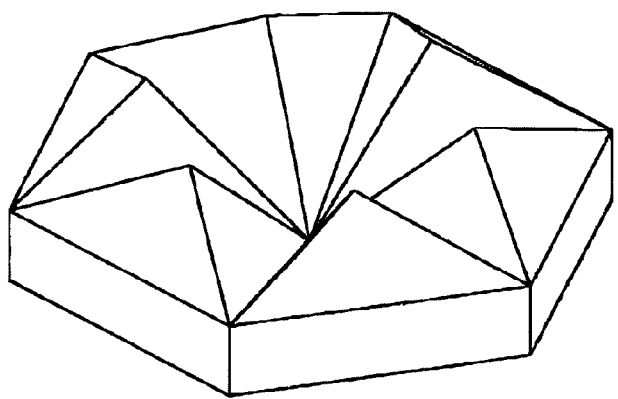
FIG. 3 is a perspective view of the retroreflective element assembly shown in FIG. 2.

FIG. 3 is a perspective view of the retroreflective element assembly shown in FIG. 2.

Figure 4:
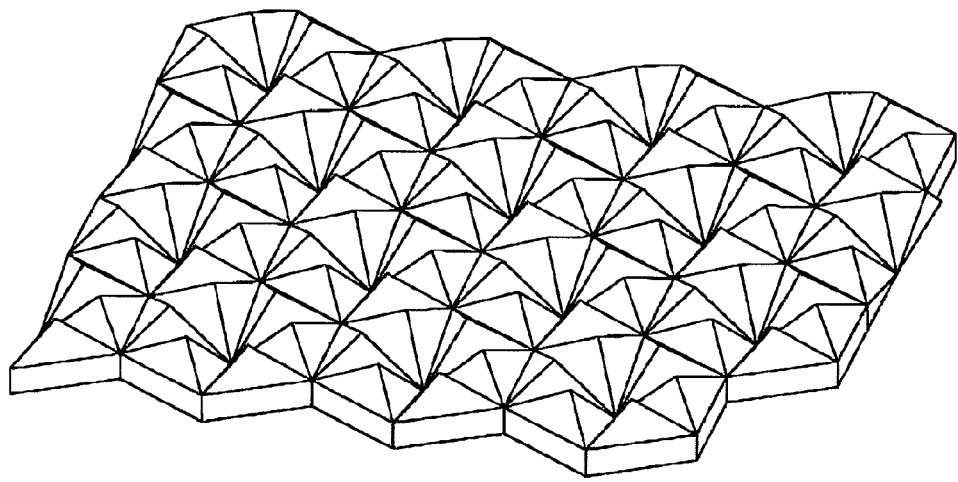
FIG. 4 is a view showing a perspective view of the retroreflective article including the retroreflective element assembly shown in FIG. 2.

FIG. 4 is a view showing a perspective view of the retroreflective article including the retroreflective element assembly shown in FIG. 2. As shown in FIG. 4, the retroreflective article is configured by Lightly connecting a large number of the retroreflective element assemblies shown in FIG. 2.

Figure 5:
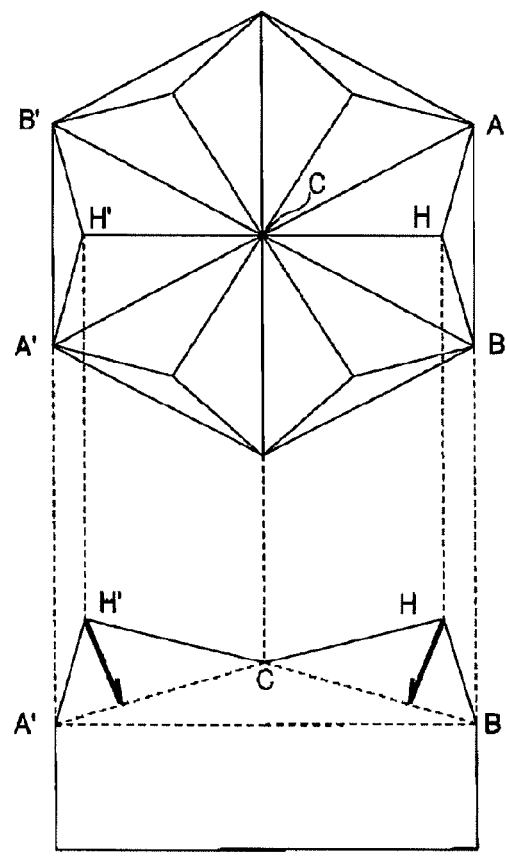
FIG. 5 is a view showing another embodiment of a retroreflective element assembly included in a retroreflective article according to the invention.

FIG. 5 is a plan view showing another embodiment of a retroreflective element assembly included in a retroreflective article according to the invention. As shown in FIG. 5, the retroreflective element assembly according to the embodiment includes six retroreflective elements of the same shape having a base in a shape of isosceles triangle. That is, a case where n=1 when the number of the retroreflective elements is expressed by $6\times4^{n-1}$ (n is an integer of 1 or more). A retroreflective article according to the embodiment is configured by connecting a large number of the retroreflective element assemblies. In the retroreflective element assembly according to the embodiment, an apex C shared by respective bases of the respective retroreflective elements is positioned higher than a common plane (shown as A'-B in the sectional view) including an outer circumference of the retroreflective element assembly so that bases of the respective retroreflective elements are not parallel to the common plane.

Optical axes of the respective retroreflective elements of the retroreflective element assembly shown in FIG. 5 are oriented to directions opposite to the directions in which the respective optical axes R and R' of the retroreflective elements included in the retroreflective element assembly shown in FIG. 2 are canted. However, since the optical axes of respective retroreflective elements shown in FIG. 5 are oriented to six directions, entrance angle characteristic and rotation angle characteristic are excellent in an entering direction of external light compared to the conventional retroreflective element assembly shown in FIG. 1.

At this time, if the length of the base lines AB (A'B') pinched between the base lines of equal length AC (A'C) and BC (B'C) of the base of each of the retroreflective elements shown in FIGS. 2 and 5 is 20 to 1000 μm, the size of the retroreflective element can be appropriate so that a spread of retro-reflected light of the retroreflective element can be inappropriate state. In addition, since the size of the retroreflective element can be appropriate, flexibility of the retroreflective article can be appropriate. Further, the length of the base lines AB (A'B') is more preferably 35 to 200 μm.

If a ratio between a distance from the apex (C) pinched between the base lines of equal length AC (A'C) and BC (B'C) of each of the bases of the retroreflective elements shown in FIGS. 2 and 5 to the common plane and a length of the base lines AB (A' B') pinched between the base lines of equal length AC (A' C) and BC (B'C) of the base of each of the retroreflective elements is 1/100 to 20/100, the cant of the optical axes is not too small so that entrance angle characteristic can be sufficiently improved. In addition, this configuration is preferable since in this case, the cants of the optical axes are appropriate so that the work can be easy, and the thickness of the retroreflective article can be appropriate so that the retroreflective article can be flexible.

Figure 6:
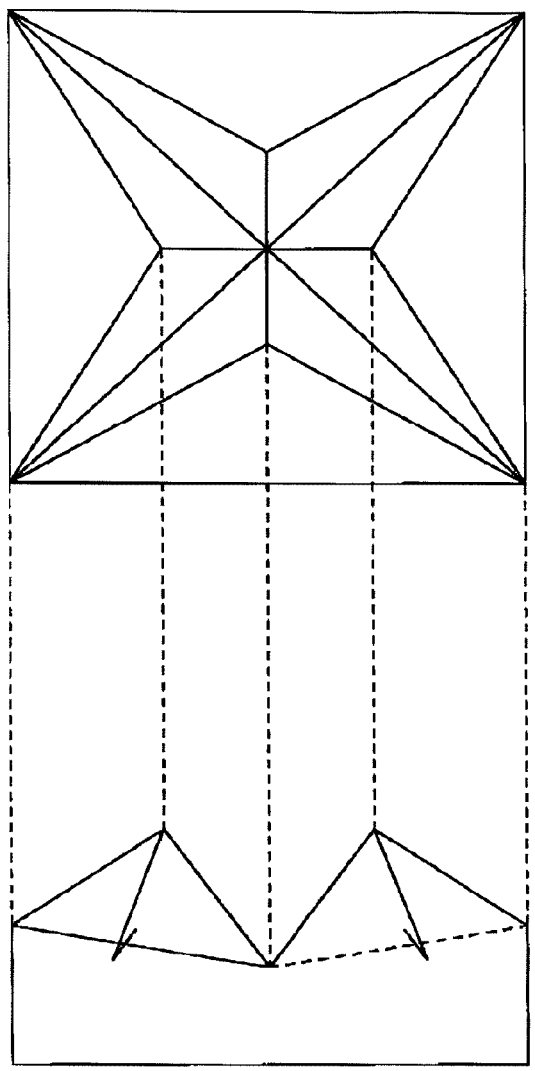
FIG. 6 is a view showing still another embodiment of a retroreflective element assembly included in a retroreflective article according to the invention.

FIG. 6 is a view showing still another embodiment of a retroreflective element assembly included in a retroreflective article according to the invention. As shown in FIG. 6, the retroreflective element assembly according to the embodiment is configured by assembling $4\times(2n-1)^2$ (n is an integer of 1 or more) retroreflective elements each having a base in a shape of isosceles triangle. The embodiment is a case where n=1 when the number of retroreflective elements is expressed by $4\times(2n-1)^2$ (n is an integer of 1 or more), that is, a case where the number of the retroreflective elements is four. In this retroreflective element assembly, the apex C shared by respective bases of the respective retroreflective elements is positioned lower than a common plane including an outer circumference of the retroreflective element assembly.

Figure 7:
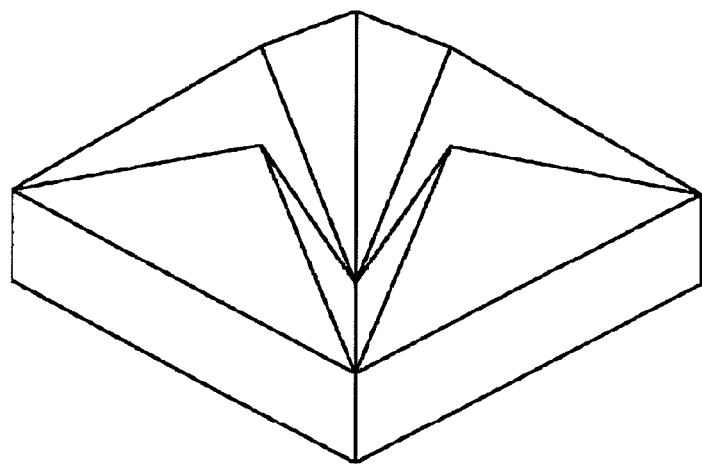
FIG. 7 is a perspective view of the retroreflective element assembly shown in FIG. 6.

FIG. 7 is a perspective view of the retroreflective element assembly shown in FIG. 6.

Figure 8:
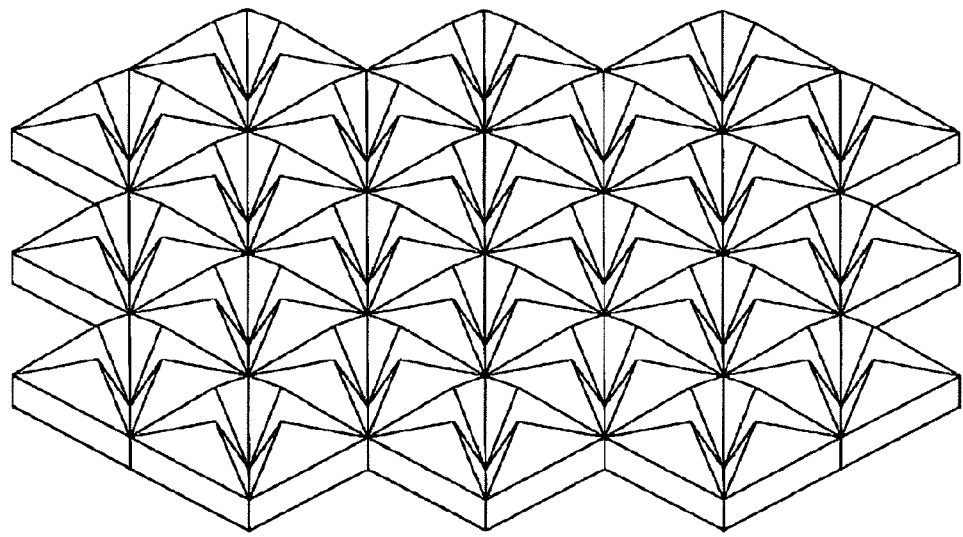
FIG. 8 is view showing a retroreflective article including the retroreflective element assembly shown in FIG. 6.

FIG. 8 is view showing a retroreflective article including the retroreflective element assembly shown in FIG. 6. As shown in FIG. 8, the retroreflective article is configured by tightly connecting a large number of the retroreflective element assemblies shown in FIG. 6.

Figure 9:
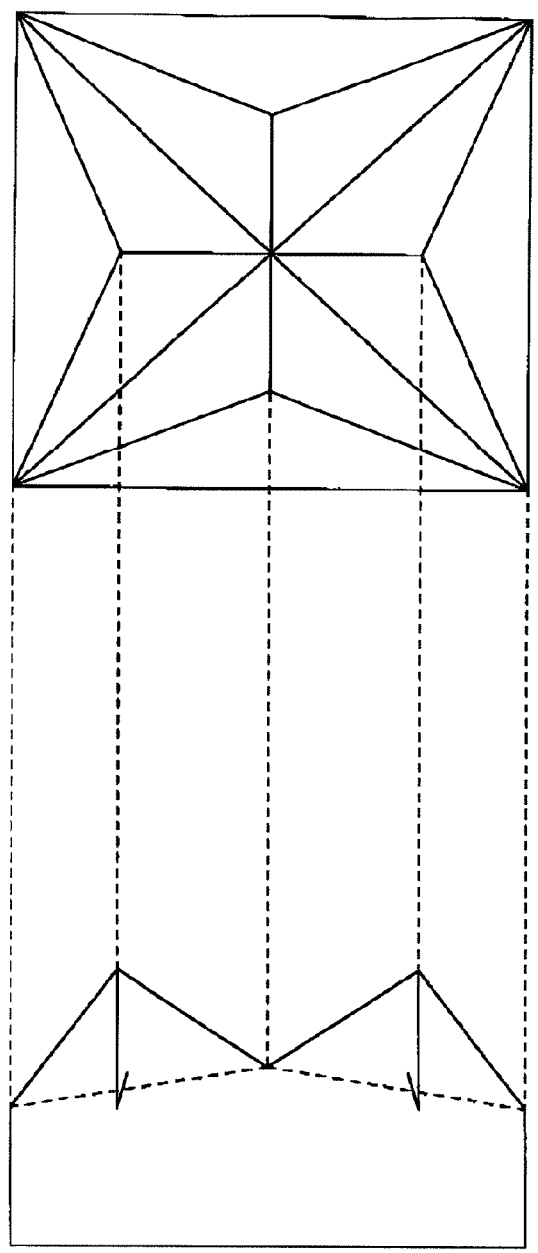
FIG. 9 is a view showing still another embodiment of a retroreflective element assembly included in a retroreflective article according to the invention.

FIG. 9 is a view showing still another embodiment of a retroreflective element assembly included in a retroreflective article according to the invention. As shown in FIG. 9, the retroreflective element assembly according to the embodiment is configured by assembling four retroreflective elements of the same shape having a base in a shape of isosceles triangle. That is a case where n=1 when the number of retroreflective elements is expressed by $4\times(2n-1)^2$ (n is an integer of 1 or more). In the retroreflective element assembly, the apex C shared by respective bases of the respective retroreflective elements is positioned higher than a common plane including an outer circumference of the retroreflective element assembly.

Figure 10:
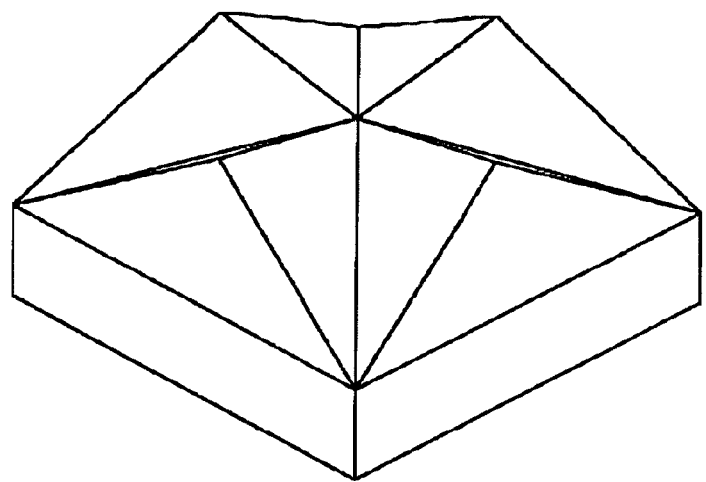
FIG. 10 is a perspective view of the retroreflective element assembly shown in FIG. 9.

FIG. 10 is a perspective view of the retroreflective element assembly shown in FIG. 9.

Figure 11:
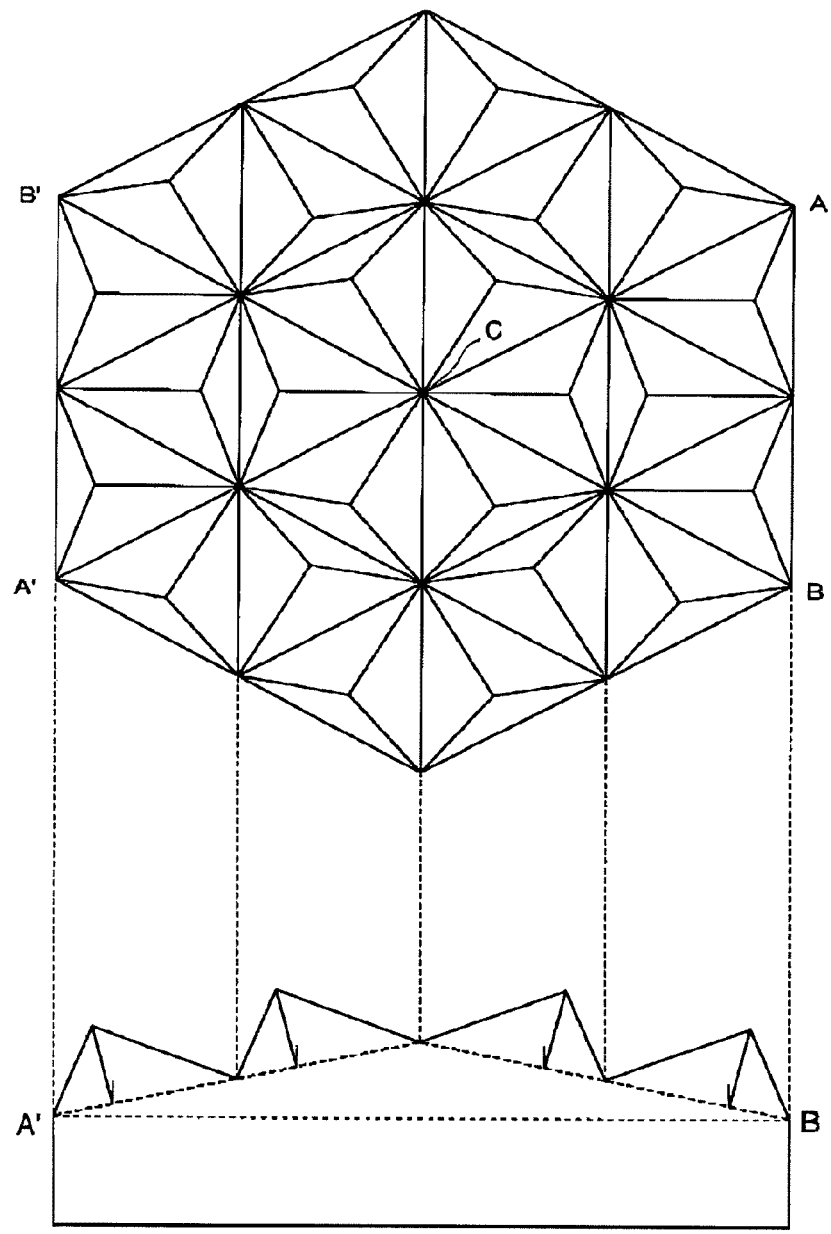
FIG. 11 is a plan view showing still another embodiment of a retroreflective element assembly included in a retroreflective article according to the invention.

FIG. 11 is a plan view showing still another embodiment of a retroreflective element assembly included in a retroreflective article according to the invention. The retroreflective element assembly according to the embodiment is configured by twenty four retroreflective elements of the same shape having a base in a shape of isosceles triangle and has the outer circumference in the shape of regular hexagon. That is a case where n=2 when the number of retroreflective elements is expressed by $6\times4^{n-1}$ (n is an integer of 1 or more). The bases of the respective retroreflective elements are not on the common plane (shown as A'-B in the sectional view) including an outer circumference of the retroreflective element assembly and are not parallel to the common plane.

Since the optical axes of respective retroreflective elements shown in FIG. 11 are oriented to six directions similarly to the retroreflective element assemblies shown in FIGS. 2 and 5, entrance angle characteristic and rotation angle characteristic are excellent in an entering direction of external light compared to the conventional cube corner retroreflective element assembly shown in FIG. 1.

Figure 12:
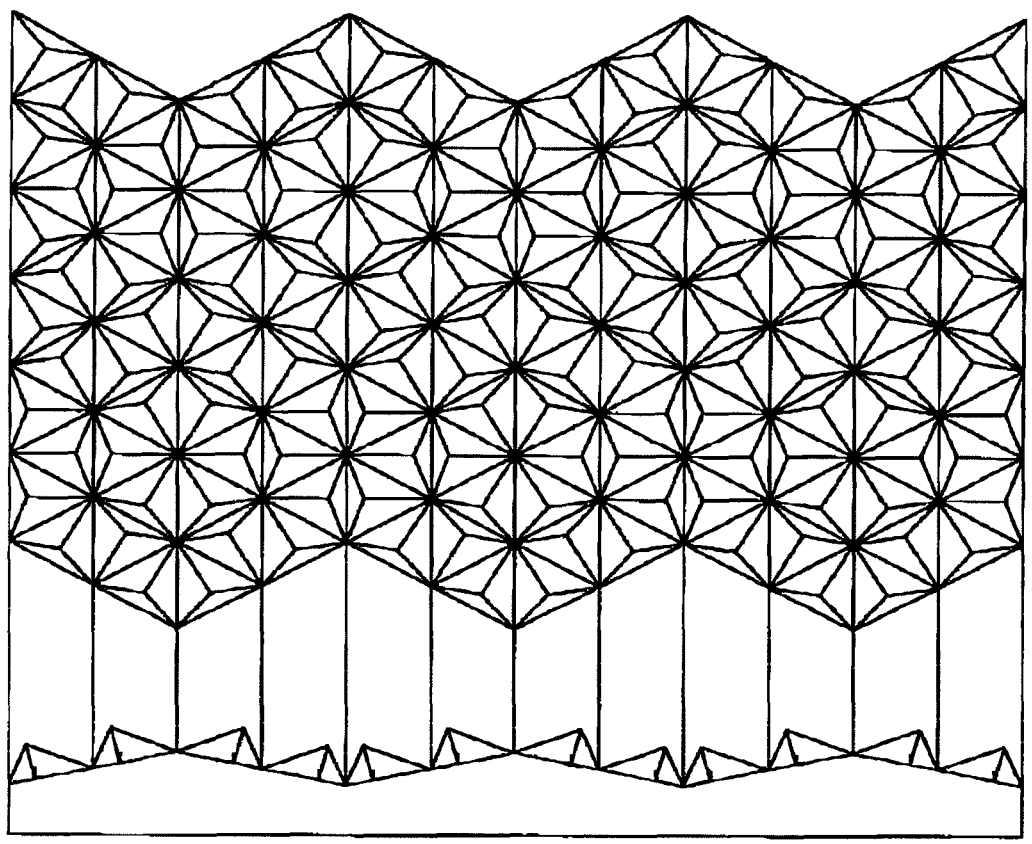
FIG. 12 is view showing a retroreflective article including the retroreflective element assembly shown in FIG. 11.

FIG. 12 is view showing an embodiment of a retroreflective article according to the invention configured by the retroreflective element assembly shown in FIG. 11. As shown in FIG. 12, the retroreflective article is configured by tightly connecting a large number of the retroreflective element assemblies shown in FIG. 11.

Figure 13:
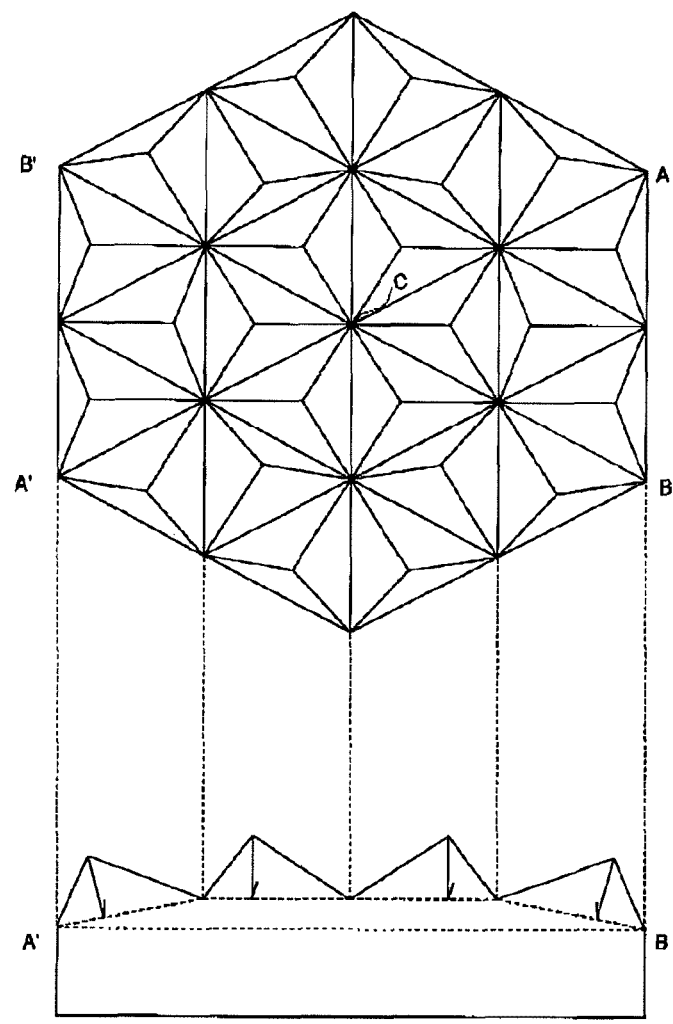
FIG. 13 is a plan view showing still another embodiment of a retroreflective element assembly included in a retroreflective article according to the invention.

FIG. 13 is a plan view showing still another embodiment of a retroreflective element assembly included in a retroreflective article according to the invention. The retroreflective element assembly according to the embodiment is a case where n=2 when the number of retroreflective elements is expressed by $6\times4^{n-1}$ (n is an integer of 1 or more), that is, the retroreflective element assembly is configured by twenty four retroreflective elements and has the outer circumference in the shape of regular hexagon. The bases of the six retroreflective elements positioned in central portion are parallel to the common plane (shown as A'-B in the sectional view) including the outer circumference. On the other hand, bases of the retroreflective elements positioned around the six retroreflective elements positioned in the central portion are not parallel to the common plane including the outer circumference, respectively.

Figure 14:
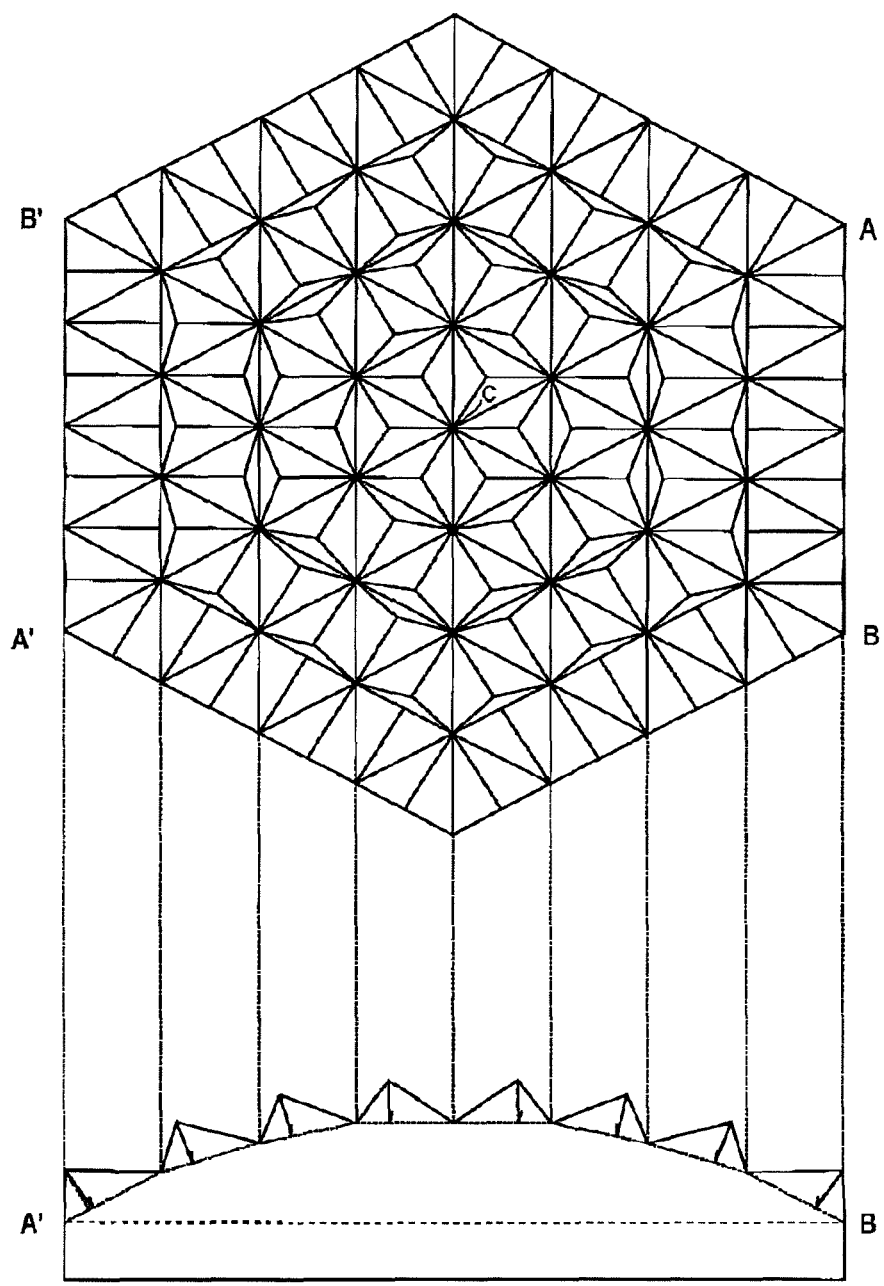
FIG. 14 is a plan view showing still another embodiment of a retroreflective element assembly included in a retroreflective article according to the invention.

FIG. 14 is a plan view showing still another embodiment of a retroreflective element assembly included in a retroreflective article according to the invention. The retroreflective element assembly according to the invention is configured by ninety six retroreflective elements and has the outer circumference in the shape of regular hexagon. That is a case where n=3 when the number of retroreflective elements is expressed by $6\times4^{n-1}$ (n is an integer of 1 or more). A base of a group of the six retroreflective elements positioned in central portion is parallel to the common plane (shown as A'-B in the sectional view) including the outer circumference, but the bases of the respective elements included in the assembly are not respectively on the common plane including the outer circumference and are not parallel to the common plane. The optical axes of the respective retroreflective elements have different cant in such a manner that a cant with respect to a direction perpendicular to the common plane including the outer circumference increases as the retroreflective element is positioned closer to the outer circumference.

Since optical axes of the retroreflective article according to the invention configured by connecting a plurality of the retroreflective element assemblies of the embodiment variously cant as shown in FIG. 14, the retroreflective article can have excellent entrance angle characteristic.

Here, if the length of the base lines pinched between the base lines of equal length of the base of each of the retroreflective elements of the retroreflective element assemblies shown in FIGS. 6 to 14 is 20 to 1000 μm, a size of the triangular pyramidal cube corner retroreflective elements can be appropriate so that a spread of retro-reflected light of the triangular pyramidal cube corner reflective elements can be in appropriate state and the size of the triangular pyramidal cube corner retroreflective elements can be appropriate. It is more preferable if the length of the base lines is 35 to 200 μm.

If a ratio between a distance from the apex pinched between the base lines of equal length of each of the bases of the retroreflective elements shown in FIGS. 6 to 14 to the common plane and a length of the base lines pinched between the base lines of equal length of the base of each of the retroreflective elements is 1/100 to 20/100, the cant of the optical axes is not too small so that entrance angle characteristic can be sufficiently improved, the cants of the optical axes are appropriate so that the work can be easy, and the thickness of the multi-directional cube corner retroreflective article can be appropriate so that the multi-directional cube corner retroreflective article can be flexible. Therefore, such configuration is preferable.

As described above, a retroreflective article according to the invention is configured by connecting a large number of retroreflective element assemblies, in each of which, $4 \times (2n-1)^2$ or $6 \times 4^{n-1}$ (n is an integer of 1 or more) retroreflective elements are assembled. By configuring in such a way, a retroreflective element assembly can be formed with triangular pyramidal cube corner retroreflective elements packed on a plane so that high retroreflective performance can be obtained.

EXAMPLES

Hereinafter, the invention will be more concretely explained with an example, but the invention is not limited thereto.

<Coefficient of Retroreflection>

Coefficients of retroreflection described herein including those of the examples are measured by a method to be described below. As a retroreflectometer, "Model 920" manufactured by Gamma Scientific Inc. was used. A retroreflective article of 100 mm×100 mm was used as a sample and coefficients of retroreflection were measured while setting the observation angle to 0.2° and the entrance angle to 5°, 15°, and 30', and for appropriate five positions of the sample in an angle condition where the rotation angle is changed from 0° to 345° at 15° interval according to ASTM E810-91. Then, their average is calculated as a coefficient of retroreflection of the retroreflective sheeting.

Comparative Example

A retroreflective article (comparative article), in which a large number of the retroreflective element assemblies shown in FIG. 1 are connected, was manufactured. For manufacturing, first, a brass mother die arranged with a large number of retroreflective elements, each of which is a canted isosceles-triangular pyramidal cube corner retroreflective element having an optical axis canted by −9° in such a manner that each of the elements has a height (h) of 100 was formed by using a fly-cutting method.

Using this brass mother die, a die of Nickel for molding a cube corner retroreflective article was formed by electroforming using nickel sulfamate solution having a concentration of 55% to have a recessed shape where the shape of the cube corner retroreflective article is inverted. By using this molding die, a polycarbonate resin sheet having a thickness of 200 μm ("Iupilon H3000" manufactured by Mitsubishi Engineering-Plastics Co.) was compression-molded in a condition where a molding temperature is 200° C. and a molding pressure is 50 kg/cm². Next, the resin sheet was cooled to 30° C. under pressure, and then the resin sheet was taken out. Accordingly, a polycarbonate resin retroreflective article in which a large number of retroreflective element assemblies are connected on the surface was formed.

As shown in FIG. 1, each of the retroreflective elements of the comparative article has a shape where a base (ABC, A'B'C, and the like) has a shape of isosceles triangle and all bases of respective retroreflective elements are positioned on the common plane (shown as A'-B in the sectional view) including the outer circumference.

Example

A retroreflective article (inventive article) in which a large number of the retroreflective element assemblies shown in FIG. 2 are connected was manufactured by the same method described for the Comparative Example.

Each of the retroreflective elements in the Example has the same shape as each of the retroreflective elements in the Comparative Example. Each of the retroreflective elements of the Example is also formed in such a manner that an optical axis is canted by −9° with respect to the base (ABC, A'B'C, or the like) thereof. In addition, respective bases of the respective retroreflective elements are not parallel to the common plane (shown as A'-B in the sectional view) including the hexagonal outer circumference of the retroreflective element assembly.

Coefficients of retroreflection measured at the observation angle of 0.2° and at the entrance angle of 5°, 15°, and 30° while changing the direction angle of the retroreflective articles from 0° to 345° at 15° interval are shown in Table 1 for the comparative article and in Table 2 for the inventive article, respectively.

Figure 15:
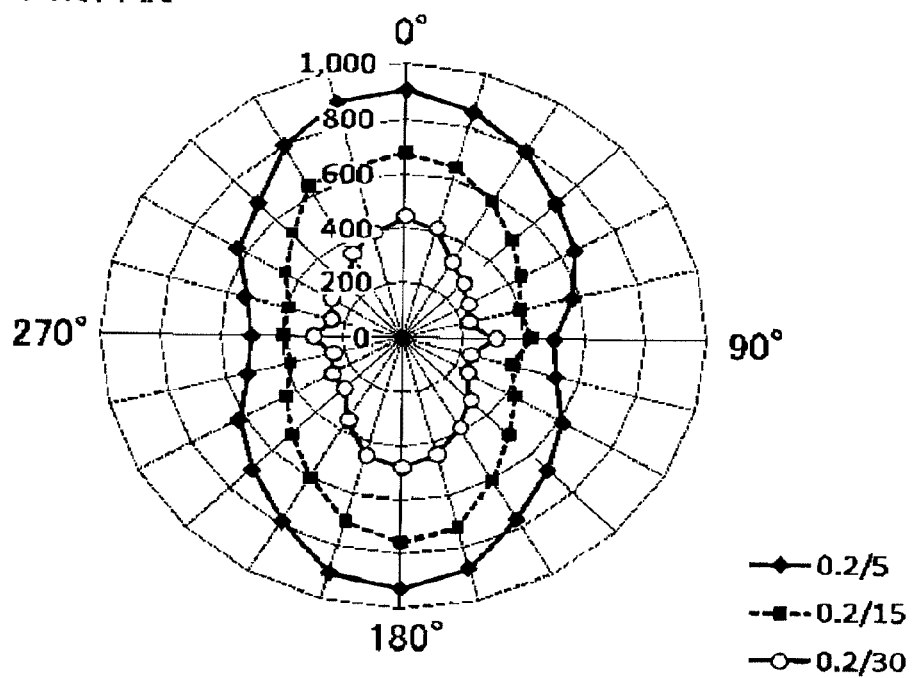
FIG. 15 is a radar chart showing performance of a Comparative Example.
Figure 16:
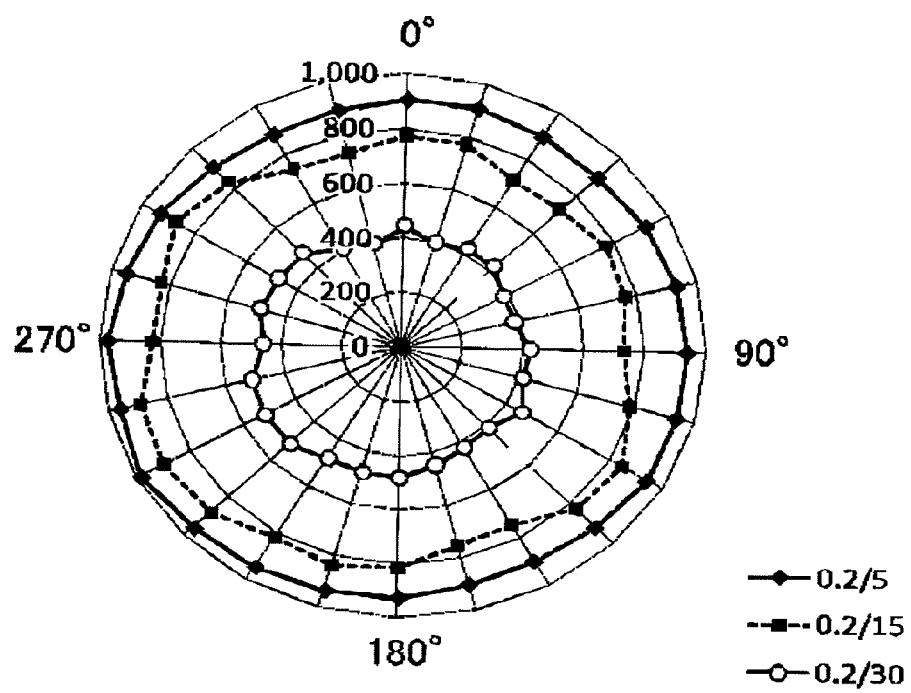
FIG. 16 is a radar chart showing performance of an Example.

In addition, radar charts of the coefficients of retroreflection at the observation angle of 0.2° and at the entrance angle of 5°, 15°, and 30° while changing the rotation angle of the retroreflective articles from 0° to 345° at 15° interval are shown in FIG. 15 for the comparative article and in FIG. 16 for the inventive article, respectively.

As is clear from FIGS. 15 and 16, the retroreflective article according to the invention exhibits a generally uniform retroreflective performance for all rotation angles and has a significant difference from the comparative article particularly regarding large entrance angles.

A traffic sign using a retroreflective sheeting having such an uniform rotation angle characteristic exhibits a generally uniform retroreflective performance in various road conditions such as a curved road and a multilane road so that the traffic sign is excellent in visibility.

TABLE 1

|  | 0.2/5 | 0.2/15 | 0.2/30 |
|---|---|---|---|
| 0° | 904 | 673 | 442 |
| 15° | 856 | 643 | 410 |
| 30° | 792 | 578 | 317 |
| 45° | 702 | 503 | 280 |
| 60° | 647 | 448 | 248 |
| 75° | 573 | 399 | 224 |
| 90° | 497 | 425 | 305 |
| 105° | 521 | 376 | 230 |
| 120° | 610 | 429 | 247 |
| 135° | 682 | 500 | 318 |
| 150° | 763 | 603 | 382 |
| 165° | 876 | 721 | 445 |
| 180° | 923 | 756 | 477 |
| 195° | 899 | 703 | 451 |
| 210° | 784 | 599 | 356 |
| 225° | 697 | 514 | 269 |
| 240° | 623 | 445 | 267 |
| 255° | 531 | 385 | 238 |
| 270° | 501 | 398 | 294 |
| 285° | 541 | 393 | 245 |
| 300° | 634 | 455 | 275 |
| 315° | 685 | 524 | 256 |
| 330° | 803 | 629 | 345 |
| 345° | 887 | 641 | 395 |

TABLE 2

|  | 0.2/5 | 0.2/15 | 0.2/30 |
|---|---|---|---|
| 0° | 904 | 772 | 442 |
| 15° | 906 | 767 | 397 |
| 30° | 896 | 714 | 421 |
| 45° | 892 | 723 | 423 |
| 60° | 918 | 767 | 384 |
| 75° | 930 | 762 | 382 |
| 90° | 937 | 736 | 423 |
| 105° | 938 | 785 | 417 |
| 120° | 940 | 849 | 461 |
| 135° | 915 | 825 | 410 |
| 150° | 895 | 747 | 420 |
| 165° | 899 | 751 | 445 |
| 180° | 923 | 812 | 477 |
| 195° | 931 | 836 | 479 |
| 210° | 944 | 816 | 477 |
| 225° | 959 | 878 | 516 |
| 240° | 988 | 903 | 520 |
| 255° | 964 | 892 | 514 |
| 270° | 977 | 828 | 463 |
| 285° | 951 | 829 | 490 |
| 300° | 936 | 874 | 480 |
| 315° | 905 | 827 | 473 |
| 330° | 884 | 740 | 409 |
| 345° | 887 | 728 | 388 |

INDUSTRIAL APPLICABILITY

According to the invention, a cube corner retroreflective article capable of improving entrance angle characteristic and rotation angle characteristic can be provided.

The invention claimed is:

1. A multi-directional cube corner retroreflective article, comprising:
a large number of retroreflective element assemblies, each of which is formed by assembling triangular pyramidal cube corner retroreflective elements each having an isosceles-triangular base (ABC) and an element apex (H) while sharing an apex (C) and base lines of equal length (AC and BC) of the base, are connected, wherein
a shape of an outer circumference of each of the retroreflective element assemblies is a regular polygon and the bases of at least two of the triangular pyramidal cube corner retroreflective elements are not parallel to a common plane including the outer circumference.

2. The multi-directional cube corner retroreflective article according to claim 1, wherein the apex (C) shared by the bases of the respective triangular pyramidal cube corner retroreflective elements included in each of the retroreflective element assemblies is positioned lower than the common plane.

3. The multi-directional cube corner retroreflective article according to claim 2, wherein a length of a base lines (AB) pinched between the base lines of equal length (AC and BC) of the base of each of the triangular pyramidal cube corner retroreflective elements is 20 to 1000 μm.

4. The multi-directional cube corner retroreflective article according to claim 3, wherein a length of the base lines (AB) pinched between the base lines of equal length (AC and BC) of the base of each of the triangular pyramidal cube corner retroreflective elements is 35 to 200 μm.

5. The multi-directional cube corner retroreflective article according to claim 4, wherein a ratio between a distance from the apex (C) pinched between the base lines of equal length (AC and BC) of the base of each of the triangular pyramidal cube corner retroreflective elements to the common plane and a length of the base lines (AB) pinched between the base lines of equal length (AC and BC) of the base of each of the triangular pyramidal cube corner retroreflective elements is 3/100 to 20/100.

6. The multi-directional cube corner retroreflective article according to claim 3, wherein a ratio between a distance from the apex (C) pinched between the base lines of equal length (AC and BC) of the base of each of the triangular pyramidal cube corner retroreflective elements to the common plane and a length of the base lines (AB) pinched between the base lines of equal length (AC and BC) of the base of each of the triangular pyramidal cube corner retroreflective elements is 1/100 to 20/100.

7. The multi-directional cube corner retroreflective article according to claim 1, wherein the apex (C) shared by the bases of the respective triangular pyramidal cube corner retroreflective elements included in each of the retroreflective element assemblies is positioned higher than the common plane.

8. The multi-directional cube corner retroreflective article according to claim 7, wherein a length of a base lines (AB) pinched between the base lines of equal length (AC and BC) of the base of each of the triangular pyramidal cube corner retroreflective elements is 20 to 1000 μm.

9. The multi-directional cube corner retroreflective article according to claim 8, wherein a length of the base lines (AB) pinched between the base lines of equal length (AC and BC) of the base of each of the triangular pyramidal cube corner retroreflective elements is 35 to 200 μm.

10. The multi-directional cube corner retroreflective article according to claim 9, wherein a ratio between a distance from the apex (C) pinched between the base lines of equal length (AC and BC) of the base of each of the triangular pyramidal cube corner retroreflective elements to the common plane and a length of the base lines (AB) pinched between the base lines of equal length (AC and BC) of the base of each of the triangular pyramidal cube corner retroreflective elements is 3/100 to 20/100.

11. The multi-directional cube corner retroreflective article according to claim 8, wherein a ratio between a distance from the apex (C) pinched between the base lines of equal length (AC and BC) of the base of each of the triangular pyramidal cube corner retroreflective elements to the common plane and a length of the base lines (AB) pinched between the base lines of equal length (AC and BC) of the base of each of the triangular pyramidal cube corner retroreflective elements is 1/100 to 20/100.

12. The multi-directional cube corner retroreflective article according to any one of claims 1 to 7, wherein each of the retroreflective element assemblies is configured by $4\times(2n-1)^2$ or $6\times4^{n-1}$ (n is an integer of 1 or more) triangular pyramidal cube corner retroreflective elements.

13. The multi-directional cube corner retroreflective article according to claim 12, wherein a length of a base lines (AB) pinched between the base lines of equal length (AC and BC) of the base of each of the triangular pyramidal cube corner retroreflective elements is 20 to 1000 μm.

14. The multi-directional cube corner retroreflective article according to claim 13, wherein a length of the base lines (AB) pinched between the base lines of equal length (AC and BC) of the base of each of the triangular pyramidal cube corner retroreflective elements is 35 to 200 μm.

15. The multi-directional cube corner retroreflective article according to claim 14, wherein a ratio between a distance from the apex (C) pinched between the base lines of equal length (AC and BC) of the base of each of the triangular pyramidal cube corner retroreflective elements to the common plane and a length of the base lines (AB) pinched between the base lines of equal length (AC and BC) of the base of each of the triangular pyramidal cube corner retroreflective elements is 3/100 to 20/100.

16. The multi-directional cube corner retroreflective article according to claim 13, wherein a ratio between a distance from the apex (C) pinched between the base lines of equal length (AC and BC) of the base of each of the triangular pyramidal cube corner retroreflective elements to the common plane and a length of the base lines (AB) pinched between the base lines of equal length (AC and BC) of the base of each of the triangular pyramidal cube corner retroreflective elements is 1/100 to 20/100.

17. The multi-directional cube corner retroreflective article according to claim 1, wherein a length of a base lines (AB) pinched between the base lines of equal length (AC and BC) of the base of each of the triangular pyramidal cube corner retroreflective elements is 20 to 1000 μm.

18. The multi-directional cube corner retroreflective article according to claim 17, wherein a length of the base lines (AB) pinched between the base lines of equal length (AC and BC) of the base of each of the triangular pyramidal cube corner retroreflective elements is 35 to 200 μm.

19. The multi-directional cube corner retroreflective article according to claim 18, wherein a ratio between a distance from the apex (C) pinched between the base lines of equal length (AC and BC) of the base of each of the triangular pyramidal cube corner retroreflective elements to the common plane and a length of the base lines (AB) pinched between the base lines of equal length (AC and BC) of the base of each of the triangular pyramidal cube corner retroreflective elements is 3/100 to 20/100.

20. The multi-directional cube corner retroreflective article according to claim 17, wherein a ratio between a distance from the apex (C) pinched between the base lines of equal length (AC and BC) of the base of each of the triangular pyramidal cube corner retroreflective elements to the common plane and a length of the base lines (AB) pinched between the base lines of equal length (AC and BC) of the base of each of the triangular pyramidal cube corner retroreflective elements is 1/100 to 20/100.

* * * * *

UNITED STATES PATENT AND TRADEMARK OFFICE
CERTIFICATE OF CORRECTION

| | | |
|---|---|---|
| PATENT NO. | : 8,517,546 B2 | |
| APPLICATION NO. | : 12/934718 | |
| DATED | : August 27, 2013 | |
| INVENTOR(S) | : Ikuo Mimura | |

It is certified that error appears in the above-identified patent and that said Letters Patent is hereby corrected as shown below:

In the Specification

COLUMN 1:

Line 41, "equilateral" should read --an equilateral--;
    Line 44, "is isosceles" should read --is an isosceles--;
    Line 57, "element." should read --elements.--;
    Line 62, "of isosceles" should read --of an isosceles--; and
    Line 66, "negative" should read --a negative--.

COLUMN 2:

Line 5, "of isosceles" should read --of an isosceles--;
    Line 10, "positive" should read --a positive--;
    Line 16, "in pair" should read --paired--;
    Line 25, "both of" should read --both--;
    Line 28, "disclose" should read --discloses--;
    Line 35, "forming elements" should read --forming retroreflective elements--;
    Line 42, "difficulty of" should read --the difficulty of--; and
    Line 44, "is limited," should read --are limited,--.

COLUMN 3:

Line 10, "not much" should read --not extensively--; and
    Line 11, "surfaces" should read --surface--.

COLUMN 4:

Line 33, "a base lines" should read --a base line--; and
    Line 44, "a base lines" should read --a base line--.

Signed and Sealed this
Eighteenth Day of February, 2014

Michelle K. Lee
*Deputy Director of the United States Patent and Trademark Office*

COLUMN 5:

Line 33, "is view" should read --is a view--; and
Line 43, "is view" should read --is a view--.

COLUMN 6:

Line 22, "it is known" should read --there is known--;
Line 60, "Lightly" should read --tightly--; and
Line 67, "of isosceles" should read --of an isosceles--.

COLUMN 7:

Line 24, "base lines" should read --base line--;
Line 29, "inap-" should read --in an ap- --;
Line 53, "of isosceles" should read --of an isosceles--; and
Line 63, "is view" should read --is a view--.

COLUMN 8:

Line 6, "of isosceles" should read --of an isosceles--;
Line 21, "of isosceles" should read --of an isosceles--;
Line 22, "of regular" should read --of a regular--;
Line 36, "is view" should read --is a view--;
Line 50, "of regular" should read --of a regular--;
Line 51, "in central" should read --in the central--;
Line 63, "of regular" should read --of a regular--; and
Line 66, "in central" should read --in the central--.

COLUMN 9:

Line 50, "<Coefficient" should read --<Coefficients--.

COLUMN 10:

Line 6, "100 was" should read --100 μm, was--;
Line 20, "largo" should read --large--;
Line 25, "of isosceles" should read --of an isosceles--;
Line 49, "15° interval" should read --15° intervals--; and
Line 55, "15° interval" should read --15° intervals--.